United States Patent [19]
Curbelo

[11] Patent Number: 5,899,285
[45] Date of Patent: May 4, 1999

[54] MOTORIZED PERSONAL SHOPPING CART

[76] Inventor: Beatriz B. Curbelo, 2955 NW. 88th St., Miami, Fla. 33147-3775

[21] Appl. No.: 09/160,157

[22] Filed: Sep. 25, 1998

[51] Int. Cl.$^6$ ........................................................ B60K 1/00
[52] U.S. Cl. ...................................... 180/65.1; 280/33.991; 280/DIG. 4
[58] Field of Search ................................ 180/65.1, 65.6, 180/908; 280/33.991, 33.992, DIG. 4, DIG. 5, DIG. 6

[56] References Cited

U.S. PATENT DOCUMENTS

| | | | |
|---|---|---|---|
| 3,187,830 | 6/1965 | Hilton | 180/65.6 |
| 3,190,386 | 6/1965 | Swinny | 280/33.992 |
| 4,020,916 | 5/1977 | Noble | 180/65.1 |
| 5,064,012 | 11/1991 | Losego | 180/65.1 |

*Primary Examiner*—Robert J. Oberleitner
*Assistant Examiner*—Faye M. Fleming

[57] ABSTRACT

A new motorized personal shopping cart for allowing personal items to be carried in an easier manner. The inventive device includes a container portion having an open upper end, a closed lower end, opposed front and rear walls, and opposed side walls. The closed lower end has a swivel wheel disposed thereon inwardly of the front wall. The closed lower end has a pair of rear wheels coupled thereto inwardly of the rear wall. The pair of rear wheels have an axle extending therebetween. The axle has a gear secured thereto. A U-shaped handle portion is secured to and extends upwardly from the open upper end of the container portion. A housing is secured to the rear wall of the container portion. A lower portion of the housing couples with the axle and contains the gear therein. An upper portion of the housing has an access door coupled therewith. A battery is disposed within the upper portion of the housing inwardly of the access door. A motor is secured within the lower portion of the housing. The motor is in communication with the battery. The motor has a drive gear disposed on a side portion thereof. A circular chain extends around the drive gear and the gear of the axle.

5 Claims, 3 Drawing Sheets

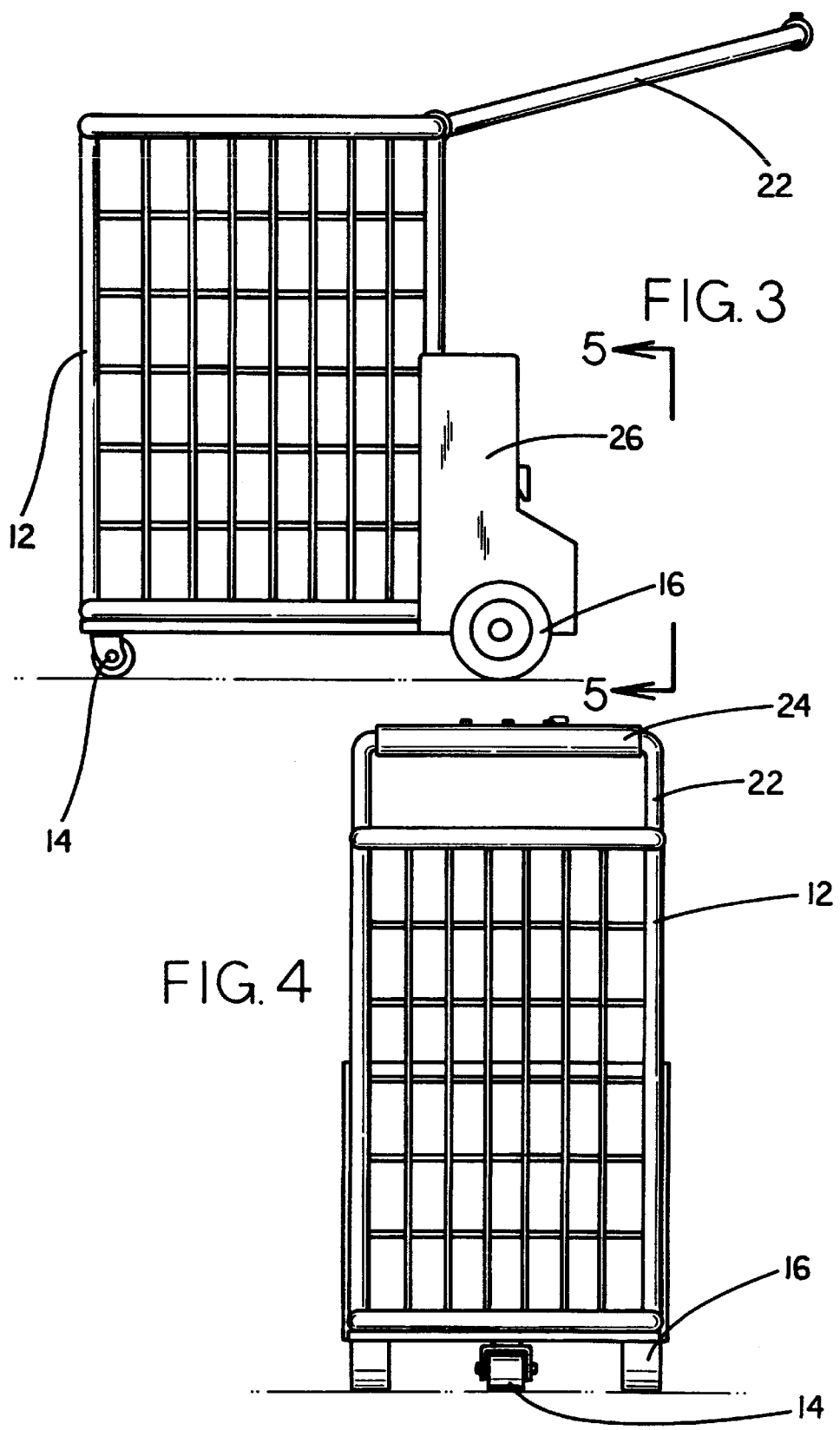

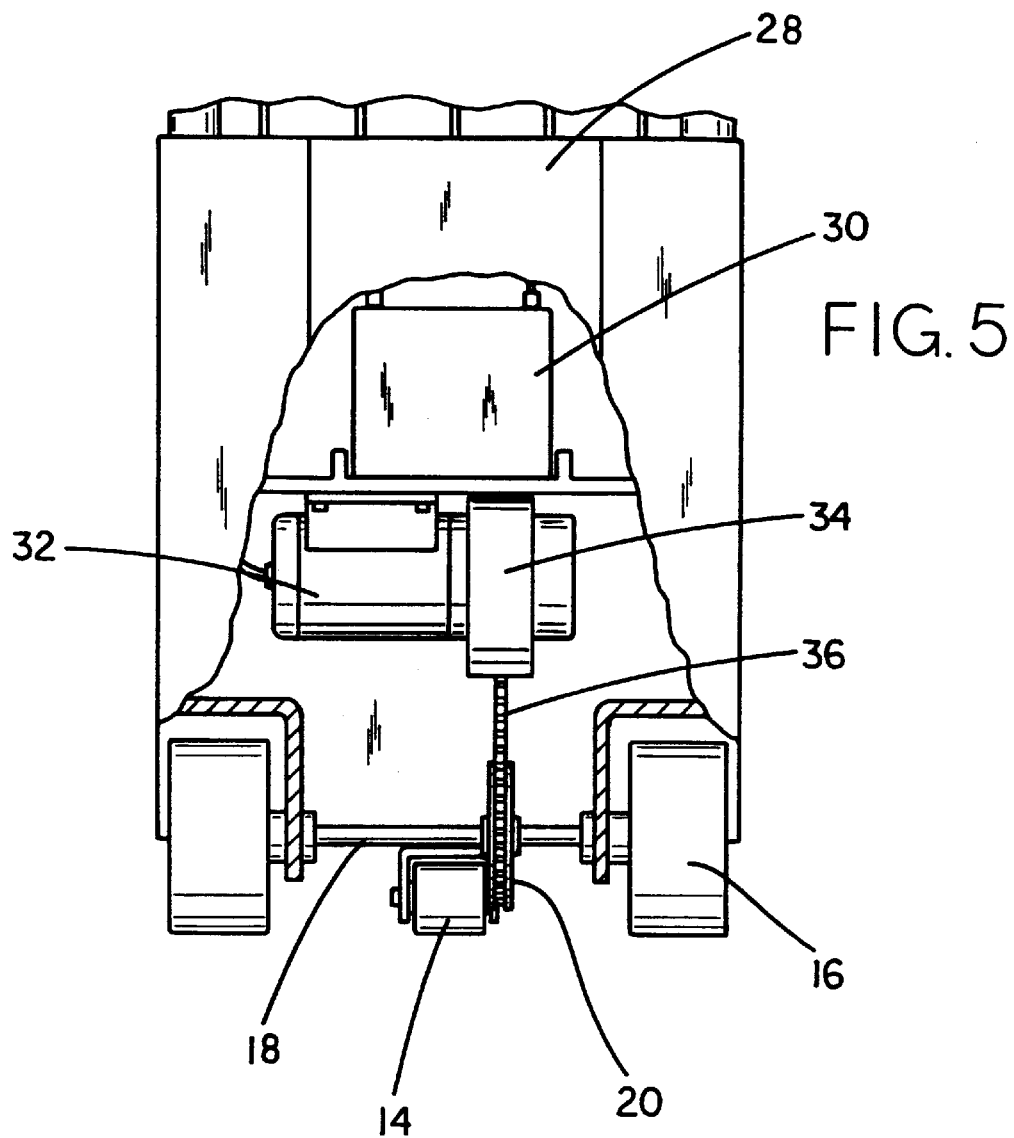

MOTORIZED PERSONAL SHOPPING CART

BACKGROUND OF THE INVENTION

1. Field of the Invention

The present invention relates to shopping carts and more particularly pertains to a new motorized personal shopping cart for allowing personal items to be carried in an easier manner.

2. Description of the Prior Art

The use of shopping carts is known in the prior art. More specifically, shopping carts heretofore devised and utilized are known to consist basically of familiar, expected and obvious structural configurations, notwithstanding the myriad of designs encompassed by the crowded prior art which have been developed for the fulfillment of countless objectives and requirements.

Known prior art shopping carts include U. S. Pat. No. 4,096,920 to Heyn; U.S. Pat. No. 4,771,840 to Keller; U.S. Patent No. Des. 309,517 to Hawkins; U.S. Pat. No. 4,020, 916 to Noble; U.S. Pat. No. 4,750,578 to Brandenfels; and U.S. Pat. No. 5,064,012 to Losego.

While these devices fulfill their respective, particular objectives and requirements, the aforementioned patents do not disclose a new motorized personal shopping cart. The inventive device includes a container portion having an open upper end, a closed lower end, opposed front and rear walls, and opposed side walls. The closed lower end has a swivel wheel disposed thereon inwardly of the front wall. The closed lower end has a pair of rear wheels coupled thereto inwardly of the rear wall. The pair of rear wheels have an axle extending therebetween. The axle has a gear secured thereto. A U-shaped handle portion is secured to and extends upwardly from the open upper end of the container portion. A housing is secured to the rear wall of the container portion. A lower portion of the housing couples with the axle and contains the gear therein. An upper portion of the housing has an access door coupled therewith. A battery is disposed within the upper portion of the housing inwardly of the access door. A motor is secured within the lower portion of the housing. The motor is in communication with the battery. The motor has a drive gear disposed on a side portion thereof. A circular chain extends around the drive gear and the gear of the axle.

In these respects, the motorized personal shopping cart according to the present invention substantially departs from the conventional concepts and designs of the prior art, and in so doing provides an apparatus primarily developed for the purpose of allowing personal items to be carried in an easier manner.

SUMMARY OF THE INVENTION

In view of the foregoing disadvantages inherent in the known types of shopping carts now present in the prior art, the present invention provides a new motorized personal shopping cart construction wherein the same can be utilized for allowing personal items to be carried in an easier manner.

The general purpose of the present invention, which will be described subsequently in greater detail, is to provide a new motorized personal shopping cart apparatus and method which has many of the advantages of the shopping carts mentioned heretofore and many novel features that result in a new motorized personal shopping cart which is not anticipated, rendered obvious, suggested, or even implied by any of the prior art shopping carts, either alone or in any combination thereof.

To attain this, the present invention generally comprises a container portion having an open upper end, a closed lower end, opposed front and rear walls, and opposed side walls. The closed lower end has a swivel wheel disposed thereon inwardly of the front wall. The closed lower end has a pair of rear wheels coupled thereto inwardly of the rear wall. The pair of rear wheels have an axle extending therebetween. The axle has a gear secured thereto. A U-shaped handle portion is secured to and extends upwardly from the open upper end of the container portion. The handle portion includes a pair of long side bars secured to the container portion. Upper ends of the side bars have an end bar extending therebetween. A housing is secured to the rear wall of the container portion. A lower portion of the housing couples with the axle and contains the gear therein. An upper portion of the housing has an access door coupled therewith. A battery is disposed within the upper portion of the housing inwardly of the access door. A motor is secured within the lower portion of the housing. The motor is in communication with the battery. The motor has a drive gear disposed on a side portion thereof. A circular chain extends around the drive gear and the gear of the axle. A control panel is disposed within the end bar of the handle portion. The control panel is in communication with the motor. The control panel includes a variable speed dial and a reverse and a neutral control switches.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motorized personal shopping cart apparatus and method which has many of the advantages of the shopping carts mentioned heretofore and many novel features that result in a new motorized personal shopping cart which is not anticipated, rendered obvious, suggested, or even implied by any of the prior art shopping carts, either alone or in any combination thereof.

It is another object of the present invention to provide a new motorized personal shopping cart which may be easily and efficiently manufactured and marketed.

It is a further object of the present invention to provide a new motorized personal shopping cart which is of a durable and reliable construction.

An even further object of the present invention is to provide a new motorized personal shopping cart which is susceptible of a low cost of manufacture with regard to both materials and labor, and which accordingly is then susceptible of low prices of sale to the consuming public, thereby making such motorized personal shopping cart economically available to the buying public.

Still yet another object of the present invention is to provide a new motorized personal shopping cart which provides in the apparatuses and methods of the prior art some of the advantages thereof, while simultaneously overcoming some of the disadvantages normally associated therewith.

Still another object of the present invention is to provide a new motorized personal shopping cart for allowing personal items to be carried in an easier manner.

Yet another object of the present invention is to provide a new motorized personal shopping cart which includes a container portion having an open upper end, a closed lower end, opposed front and rear walls, and opposed side walls. The closed lower end has a swivel wheel disposed thereon inwardly of the front wall. The closed lower end has a pair of rear wheels coupled thereto inwardly of the rear wall. The pair of rear wheels have an axle extending therebetween. The axle has a gear secured thereto. A U-shaped handle portion is secured to and extends upwardly from the open upper end of the container portion. A housing is secured to the rear wall of the container portion. A lower portion of the housing couples with the axle and contains the gear therein. An upper portion of the housing has an access door coupled therewith. A battery is disposed within the upper portion of the housing inwardly of the access door. A motor is secured within the lower portion of the housing. The motor is in communication with the battery. The motor has a drive gear disposed on a side portion thereof. A circular chain extends around the drive gear and the gear of the axle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side elevation view of the present invention.

FIG. 4 is a front elevation view of the present invention.

FIG. 5 is a rear view of the present invention as taken along line 5—5 of FIG. 3.

DESCRIPTION OF THE PREFERRED EMBODIMENT

Figure 1:
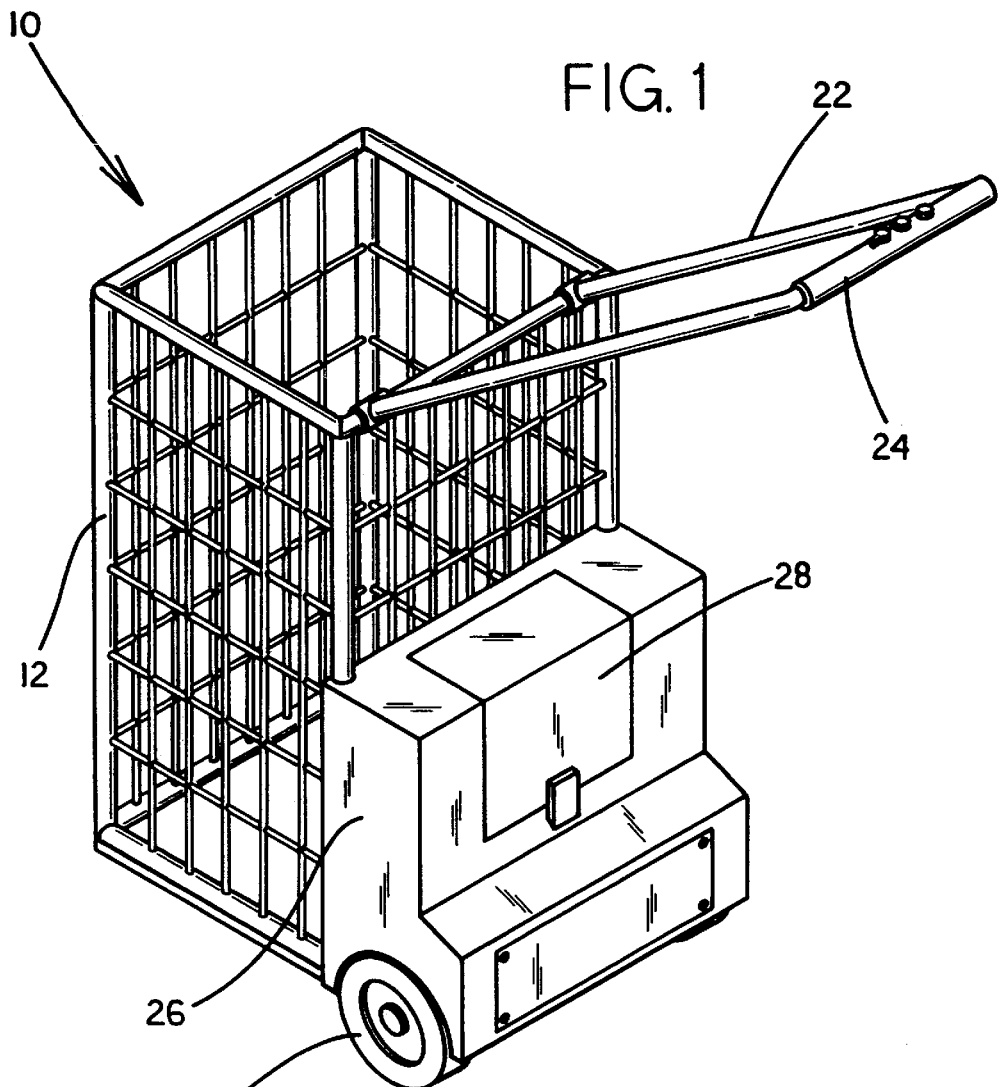
FIG. 1 is a perspective view of a new motorized personal shopping cart according to the present invention.
Figure 2:
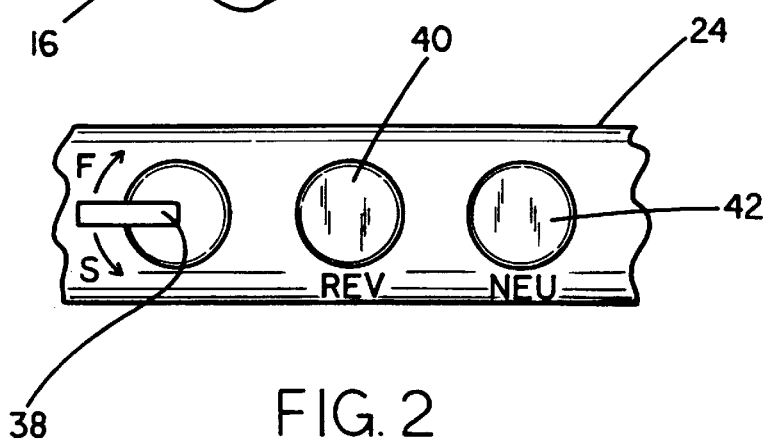
FIG. 2 is a sectional view of the handle of the present invention.

With reference now to the drawings, and in particular to FIGS. 1 through 5 thereof, a new motorized personal shopping cart embodying the principles and concepts of the present invention and generally designated by the reference numeral 10 will be described.

As best illustrated in FIGS. 1 through 5, the motorized personal shopping cart 10 comprises a container portion 12 having an open upper end, a closed lower end, opposed front and rear walls, and opposed side walls. The closed lower end has a swivel wheel 14 disposed thereon inwardly of the front wall. The closed lower end has a pair of rear wheels 16 coupled thereto inwardly of the rear wall. The pair of rear wheels 16 have an axle 18 extending therebetween. The axle 18 has a gear 20 secured thereto. The container portion is preferably constructed of grated metal with the closed lower end being solid metal.

A U-shaped handle portion is secured to and extends upwardly from the open upper end of the container portion 12. The handle portion includes a pair of long side bars 22 secured to the container portion. Upper ends of the side bars 22 have an end bar 24 extending therebetween. The handle portion could be made so as to adjust it's angle to accommodate various users.

A housing 26 is secured to the rear wall of the container portion 12. A lower portion of the housing 26 couples with the axle 18 and contains the gear 20 therein. An upper portion of the housing 26 has an access door 28 coupled therewith. The lower portion would also have a door to allow access. Such door would be attached via screws.

A battery 30 is disposed within the upper portion of the housing 26 inwardly of the access door 28.

A motor 32 is secured within the lower portion of the housing 26. The motor 32 is in communication with the battery 30. The motor 32 has a drive gear 34 disposed on a side portion thereof. A circular chain 36 extends around the drive gear 34 and the gear 20 of the axle 18.

A control panel is disposed within the end bar 24 of the handle portion. The control panel is in communication with the motor 32. The control panel includes a variable speed dial 38 and reverse 40 and a neutral control switches 42. The control panel allows the user to regulate the speed at which the device 10 travels. The manipulation of the variable speed dial 38 will control the rate of rotation of the drive gear 34 and the rear wheels 16.

In use, the present invention would fulfill the need for a motorized shopping cart that would eliminate the stress and strain of pushing or pulling a full load of groceries.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new motorized personal shopping cart for allowing personal items to be carried in an easier manner comprising, in combination:

a container portion having an open upper end, a closed lower end, opposed front and rear walls, and opposed side walls, the closed lower end having a swivel wheel disposed thereon inwardly of the front wall, the closed lower end having a pair of rear wheels coupled thereto inwardly of the rear wall, the pair of rear wheels having an axle extending therebetween, the axle having a gear secured thereto;

a U-shaped handle portion secured to and extending upwardly from the open upper end of the container portion, the handle portion including a pair of long side bars secured to the container portion, upper ends of the side bars having an end bar extending therebetween;

a housing secured to the rear wall of the container portion, a lower portion of the housing coupling with the axle and containing the gear therein, an upper portion of the housing having an access door coupled therewith;

a battery disposed within the upper portion of the housing inwardly of the access door;

a motor secured within the lower portion of the housing, the motor being in communication with the battery, the motor having a drive gear disposed on a side portion thereof, a circular chain extending around the drive gear and the gear of the axle; and a control panel disposed within the end bar of the handle portion, the control panel being in communication with the motor, the control panel including a variable speed dial and reverse and a neutral control switches.

2. A new motorized personal shopping cart for allowing personal items to be carried in an easier manner comprising, in combination:

a container portion having an open upper end, a closed lower end, opposed front and rear walls, and opposed side walls, the closed lower end having a swivel wheel disposed thereon inwardly of the front wall, the closed lower end having a pair of rear wheels coupled thereto inwardly of the rear wall, the pair of rear wheels having an axle extending therebetween, the axle having a gear secured thereto;

a U-shaped handle portion secured to and extending upwardly from the open upper end of the container portion;

a housing secured to the rear wall of the container portion, a lower portion of the housing coupling with the axle and containing the gear therein, an upper portion of the housing having an access door coupled therewith;

a battery disposed within the upper portion of the housing inwardly of the access door; and a motor secured within the lower portion of the housing, the motor being in communication with the battery, the motor having a drive gear disposed on a side portion thereof, a circular chain extending around the drive gear and the gear of the axle.

3. The motorized personal shopping cart as set forth in claim 2 wherein the handle portion includes a pair of long side bars secured to the container portion, upper ends of the side bars having an end bar extending therebetween.

4. The motorized personal shopping cart as set forth in claim 2 and further including a control panel disposed within the end bar of the handle portion, the control panel being in communication with the motor.

5. The motorized personal shopping cart as set forth in claim 4 wherein the control panel includes a variable speed dial and reverse and a neutral control switches.

* * * * *